(12) United States Patent
Hoss et al.

(10) Patent No.: US 10,781,781 B2
(45) Date of Patent: Sep. 22, 2020

(54) INJECTOR TESTING DEVICE

(71) Applicant: Robert Bosch GmbH, Stuttgart (DE)

(72) Inventors: Reinhard Hoss, Plochingen (DE);
Armin Batha, Aichwald (DE); Daniel Strack, Uhingen (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 15/761,370

(22) PCT Filed: Jul. 25, 2016

(86) PCT No.: PCT/EP2016/067662
§ 371 (c)(1),
(2) Date: Mar. 19, 2018

(87) PCT Pub. No.: WO2017/050461
PCT Pub. Date: Mar. 30, 2017

(65) Prior Publication Data
US 2018/0266378 A1  Sep. 20, 2018

(30) Foreign Application Priority Data
Sep. 21, 2015 (DE) .......... 10 2015 218 090

(51) Int. Cl.
*G01M 15/02* (2006.01)
*F02M 65/00* (2006.01)
*F04B 51/00* (2006.01)

(52) U.S. Cl.
CPC .......... *F02M 65/001* (2013.01); *F02M 65/00* (2013.01); *F04B 51/00* (2013.01); *G01M 15/02* (2013.01)

(58) Field of Classification Search
CPC .............................. G01M 15/02; F02M 65/00
USPC ............... 73/114.45, 114.77, 116.01, 116.02, 73/116.04
See application file for complete search history.

(56) References Cited

U.S. PATENT DOCUMENTS

| 4,037,468 A | * | 7/1977 | Emerson | ............... G01M 13/00 73/114.45 |
| D352,806 S | * | 11/1994 | Skovron | ............... F02M 65/001 D18/50 |

(Continued)

FOREIGN PATENT DOCUMENTS

| CN | 1975148 A | 6/2007 |
| CN | 101004161 A | 7/2007 |

(Continued)

OTHER PUBLICATIONS

International Search Report dated Sep. 16, 2016 of the corresponding International Application PCT/EP2016/067662 filed Jul. 25, 2016.

*Primary Examiner* — Erin S. McCall
(74) *Attorney, Agent, or Firm* — Norton Rose Fulbright US LLP; Gerard Messina

(57) ABSTRACT

An injector testing device includes a fluid pump configured to convey a test oil; a motor mechanically connected to the fluid pump and configured to drive the fluid pump; and a rail configured to receive the test oil conveyed by the fluid pump and to fluidly connect to at least one injector to be tested. The fluid pump, the motor, and the rail are supported elastically in the injector testing device as a common assembly.

3 Claims, 7 Drawing Sheets

(56) References Cited

U.S. PATENT DOCUMENTS

| | | | | |
|---|---|---|---|---|
| 6,234,002 B1* | 5/2001 | Sisney | ................ | F02M 65/001 |
| | | | | 134/166 R |
| 2005/0217359 A1* | 10/2005 | Wildman | ............... | F02M 65/00 |
| | | | | 73/114.51 |
| 2007/0240500 A1* | 10/2007 | Pollard | ................. | F02M 65/00 |
| | | | | 73/114.48 |
| 2009/0019935 A1* | 1/2009 | Horak | ................... | F02M 65/00 |
| | | | | 73/593 |
| 2013/0031775 A1* | 2/2013 | Cueto | ................. | F02M 55/004 |
| | | | | 29/700 |
| 2013/0206937 A1* | 8/2013 | Kordass | ................ | F02M 65/00 |
| | | | | 248/176.3 |
| 2013/0220275 A1* | 8/2013 | Stein | ..................... | F02M 53/00 |
| | | | | 123/447 |
| 2017/0058851 A1* | 3/2017 | Colvin | .................. | F02M 55/02 |
| 2018/0259423 A1* | 9/2018 | Hoss | ..................... | F02M 65/00 |
| 2018/0372050 A1* | 12/2018 | McCormack | ........ | F02M 65/006 |

FOREIGN PATENT DOCUMENTS

| | | |
|---|---|---|
| CN | 202510269 U | 10/2012 |
| DE | 10232301 A1 | 2/2004 |
| DE | 102010038760 A1 | 2/2012 |
| DE | 102011075485 A1 | 5/2012 |
| KR | 20090020904 A | 2/2009 |
| KR | 20090020916 A | 2/2009 |
| WO | 2007049038 A1 | 5/2007 |

* cited by examiner

INJECTOR TESTING DEVICE

CROSS-REFERENCE TO RELATED APPLICATIONS

The present application is the national stage of International Pat. App. No. PCT/EP2016/067662 filed Jul. 25, 2016, and claims priority under 35 U.S.C. § 119 to DE 10 2015 218 090.5, filed in the Federal Republic of Germany on Sep. 21, 2015, the content of each of which are incorporated herein by reference in their entireties.

FIELD OF THE INVENTION

The present invention relates to an injector testing device.

BACKGROUND

To test injectors in an injector testing device, a test oil is brought up to the required pressure by a high-pressure pump. To this end, the high-pressure pump (common rail pump) is powered by a drive motor. As a rule, the drive motor and high-pressure pump are supported elastically on rubber pads, in order to damp the vibrations generated during operation. To further direct the test oil under high pressure, the high-pressure pump is connected to a pressure reservoir or high-pressure rail.

Since, due to the elastic support, the high-pressure pump moves with respect to the pressure reservoir or high-pressure rail during operation, this connection must be flexible, e.g., in the form of a high-pressure hose. In particular, steel lines may not be used for this, due to the movements occurring during operation.

In comparison with steel lines, high-pressure hoses have higher costs and are subject to higher wear.

SUMMARY

Therefore, it is desirable to provide an improved injector testing device, which allows a cost-effective and low-wear fluid connection between the high-pressure pump and the pressure reservoir or high-pressure rail.

According to an example embodiment of the present invention, an injector test device includes: a fluid pump, which is configured to convey a test oil; a motor, which is connected mechanically to the fluid pump and is configured to drive the fluid pump; and a rail, which is configured to receive the test oil conveyed by the fluid pump and to fluidly connect to at least one injector to be tested. The fluid pump, the motor and the rail are supported elastically in the injector testing device as a common assembly.

Since the fluid pump and the rail are supported elastically in the injector testing device as a common assembly, relative movements between the fluid pump and the rail also do not occur during operation. Therefore, rigid fluid lines, in particular, steel lines, can be used in order to connect the fluid pump to the rail.

Such rigid fluid lines are more cost-effective than flexible high-pressure hoses and exhibit less wear. Thus, an injector testing device according to an exemplary embodiment of the present invention can be manufactured inexpensively and operated reliably.

In an example embodiment, the assembly includes a frame and/or a trough, in particular, an oil trough, the frame or the trough being supported elastically on a rack of the injector testing device. With the aid of a frame and/or a trough, the rail, the motor and the pump can be elastically supported together in a particularly effective manner.

In an example embodiment, the common assembly is supported elastically in the injector testing device by at least one pad, in particular, by at least one rubber pad. Elastic pads, in particular, rubber pads, constitute a particularly suitable, inexpensive and easily-installed device for elastic support.

In an example embodiment, the rail is formed to have at least one connection piece for connecting at least one injector to be tested. In this manner, an injector to be tested can be connected to the rail in a particularly simple and effective manner.

In an example embodiment, the rail is supported in the injector testing device so as to be able to swivel, which means that the rail can be adjusted particularly simply to the geometry of an injector to be tested. In this manner, a flexible fluid connection, in particular, a hose, between the rail and the injector can be dispensed with.

In an example embodiment, the elastically supported assembly additionally includes at least one injector holding device, which is configured to hold at least one injector to be tested. In this manner, relative movements between the rail and the injector to be tested may be prevented, and a flexible fluid connection (e.g., a hose) between the rail and the injector can be dispensed with.

In an example embodiment, the at least one injector holding device is displaceable in at least one direction, in particular, in all three spatial directions, so that an injector to be tested can be aligned with the connection piece of the rail in an optimum manner, in order to be able to dispense with a flexible fluid connection (e.g., a hose) between the rail and the injector.

In an example embodiment, the at least one injector holding device includes a clamping device for clamping an injector. A clamping device can allow an injector to be tested to be locked in position in the fixture in a rapid, secure and effective manner.

In an example embodiment, the at least one injector holding device includes a spindle, a cone and a clamping ring, which are configured to interact in such a manner, that the clamping ring is expandable by rotation of the spindle, in order to fix the injector holding device in position in the support frame, in particular, in a tube of the support frame, without deforming it.

In an example embodiment, a fluid adaptor, whose outlet side is rotatable with respect to its inlet side, is situated between the outlet of the fluid pump and the rail. With the aid of such a fluid adapter, a rotatable fluid connection between the fluid pump and the rail can also be implemented, using rigid fluid lines.

DETAILED DESCRIPTION

Figure 1:
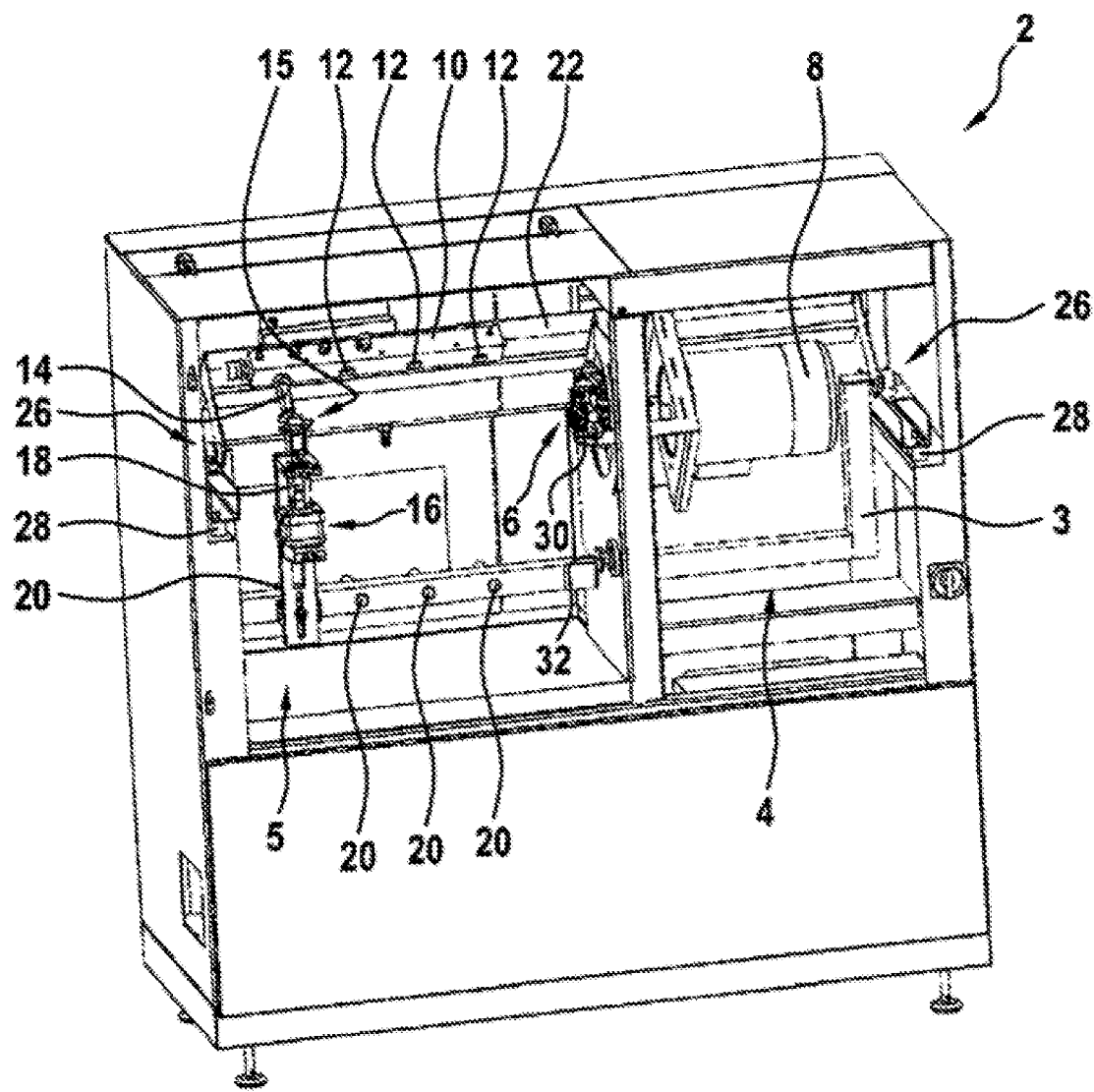
FIG. 1 shows a perspective front view of an injector testing device including an assembly according to an example embodiment of the present invention.
Figure 2A:
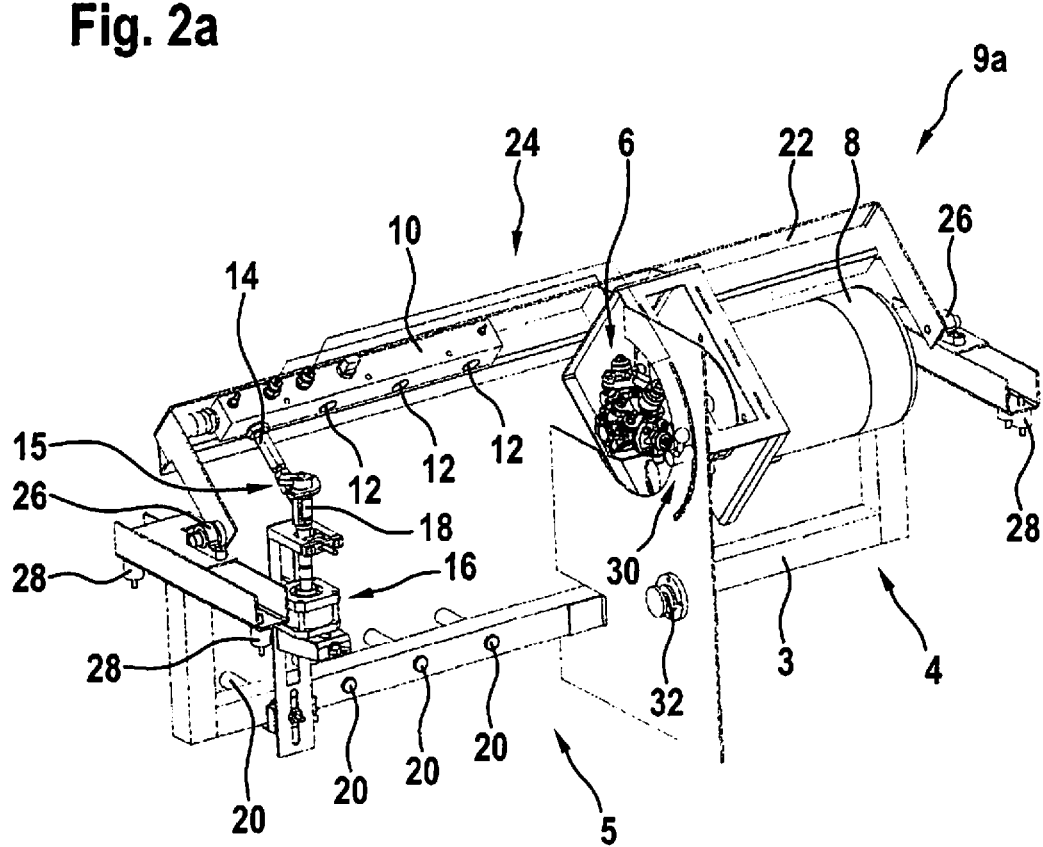
FIGS. 2a and 2b show, from two different angles, perspective views of the functional elements of the injector testing device shown in FIG. 1, according to an example embodiment of the present invention.
Figure 2B:
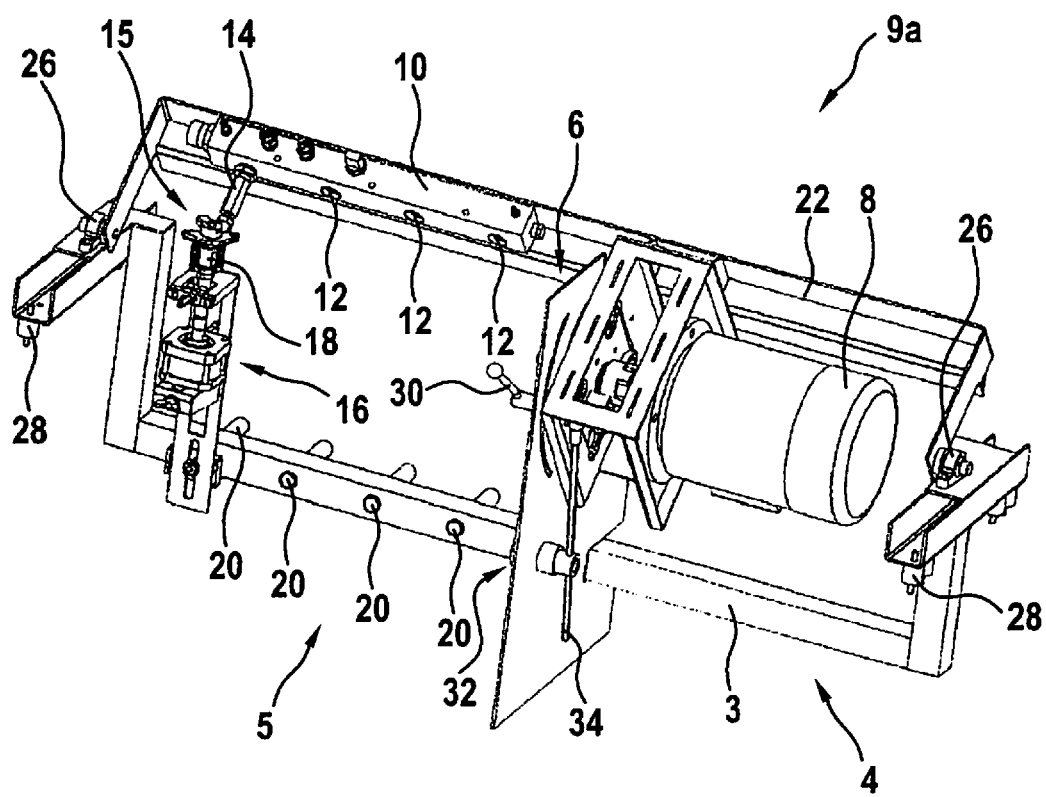

FIG. 1 shows a perspective front view of an injector testing device 2 including an assembly 9a according to an example embodiment of the present invention. FIGS. 2a and 2b show perspective views, from two different angles, of assembly 9a, which includes the functional elements of injector testing device 2.

Injector testing device 2 includes a pressure generation region 4 depicted on the right and a testing region 5 depicted on the left, in each of FIGS. 1, 2a, and 2b.

Injector testing device 2 includes a support frame 3, which supports a fluid pump (high-pressure pump) 6 and a motor 8 configured to drive fluid pump 6.

A swiveling frame 22 is supported on support frame 3 by two pillow block bearings 26 in such a manner, that it can swivel about a horizontal axis. This allows swiveling frame 22 to be adjusted about the horizontal axis to any desired angle from the horizontal to the vertical. Swiveling frame 22 can be locked into any desired position with the aid of a clamping lever 30. Alternatively, or in addition, the desired position can be secured by locking a toothed rack or threaded rod 34 into place in an actuating knob 32, the toothed rack or threaded rod being attached to swiveling frame 3.

Swiveling frame 22 supports a high-pressure reservoir, which is formed in the shape of a rail 10, is connected to the outlet side of fluid pump 6 by a plurality of fluid lines 24, and is configured to receive the fluid conveyed by fluid pump 6. Rail 10 includes a plurality of openings 12, which are each configured to receive a connection piece 14. Rail 10 is connected to an injector 18 to be tested (test specimen), via such a connection piece 14. In this context, injector 18 is held by an injector holding device (injector clamping device) 16, which is supported at support frame 3 via a tube 20, which extends out from support frame 3. Details of injector holding device 16 are described further below, with respect to FIGS. 3a-3c.

By pivoting the swiveling frame 22, the angle of the connection piece 14 attached to rail 10 is adjustable in such a manner, that connection piece 14 is oriented in a line with the pressure tube connection of injector 18. The position of injector 18 with respect to rail 10 can be set via adjustment of injector holding device 16 (see below), in such a manner, that connection piece 14 can be joined directly to the pressure tube connection of injector 18. Thus, a flexible fluid connection subject to wear, e.g., in the form of a hose, between rail 10 and injector 18, can be dispensed with.

Support frame 3 forms an assembly 9a together with swiveling frame 22, motor 8, high-pressure pump 6, and injector holding device 16. Assembly 9a is supported on a rack 5 of injector testing device 2 in a floating manner, using elastic pads 28, which are situated on the lower side of support frame 3. In this manner, vibrations, which are generated during operation of motor 8 and fluid pump 6, are not transmitted to rack 5 or only transmitted to it in a damped manner.

Since fluid pump 6 with its motor 8, rail 10, and each injector 18 mounted in an injector holding device 16 are supported together in a floating manner, no relative movements occur between these components, even during operation of fluid pump 6. Thus, fluid pump 6 and rail 10 can be interconnected by rigid fluid lines 24, which can be made of, in particular, steel. The use of flexible, high-pressure hoses subject to wear can be omitted.

By using rigid fluid lines 24, which are made, in particular, of steel, the manufacturing and maintenance costs can be reduced, and the operational reliability of injector testing device 2 can be increased.

Figure 3B:
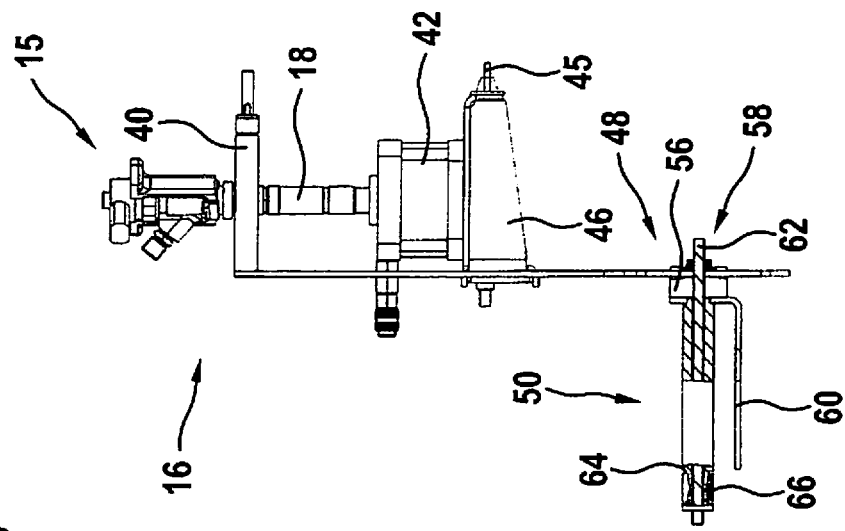
FIGS. 3a-3c show different views of an injector holding device with an injector clamped in it, according to an example embodiment of the present invention.
Figure 3A:
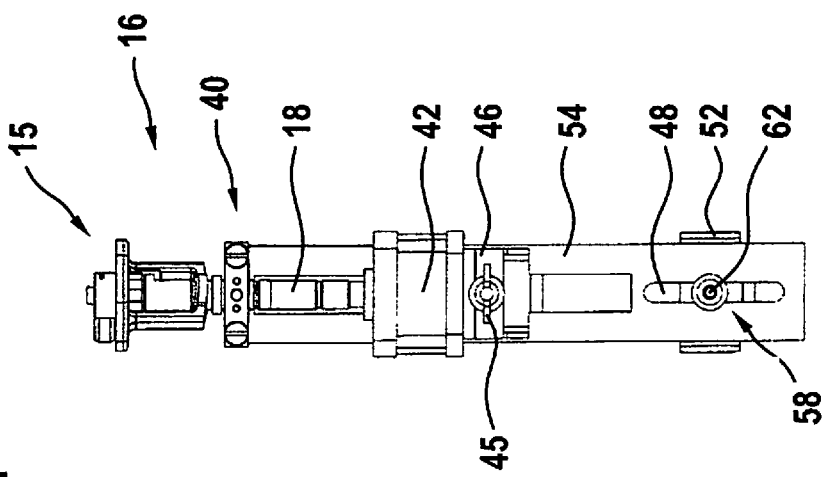
Figure 3C:
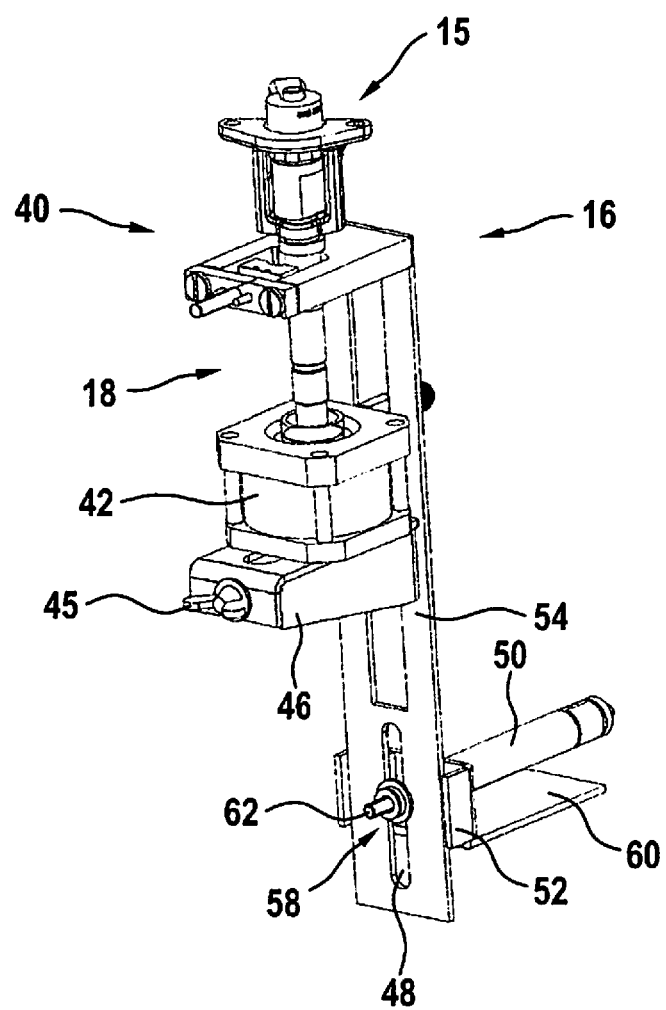

FIGS. 3a-3c show different views of the injector holding device 16 with an injector 18 clamped in it.

Injector 18 is fixed in position in injector holding device 16 by a clamping device 40. Injection chamber 42 is positioned by moving an adjustable plate 46 over the nozzle of injector 18 (not visible in FIGS. 3a-3c) and fixed in this position by tightening a clamping screw 45.

The high-pressure terminal of injector 18 is connected to rail 10 at connection piece 14, using a separable screw cap 15.

By pivoting the swiveling frame 22 about the horizontal axis, injector holding device 16 is suitably aligned with connection piece 14 in advance.

The height of injector 18 can be changed and adjusted as needed, using a slotted hole 48, which is formed in a support 54 of injector holding device 16. Lateral play in slotted hole 48 allows a lateral displacement.

By sliding a pin 50 in a tube 20 of support frame 4 (see FIG. 2a), injector holding device 16 can be moved back and forth.

The lateral inclination of injector holding device 16 can be adjusted, using the distance between a lateral guide 52 and support 54 of injector holding device 16.

The forward/backward inclination of injector 18 can be adjusted via rounded-off supports 56 and the inclination of compensating elements 58, e.g., a combination of a spherical disk and conical socket.

Injector holding device 16 is guided in tube 20 of support frame 3 via pin 50. A tongue 60 prevents rotation.

By rotating a spindle 62, whose handle is not shown in the figures, a cone 64 is pulled nearer in such a manner, that it expands a clamping ring 66. This deforms clamping ring 66 in tube 20 of support frame 3, and in this manner, allows the position of injector holding device 16 to be fixed without deformation.

Figure 4:
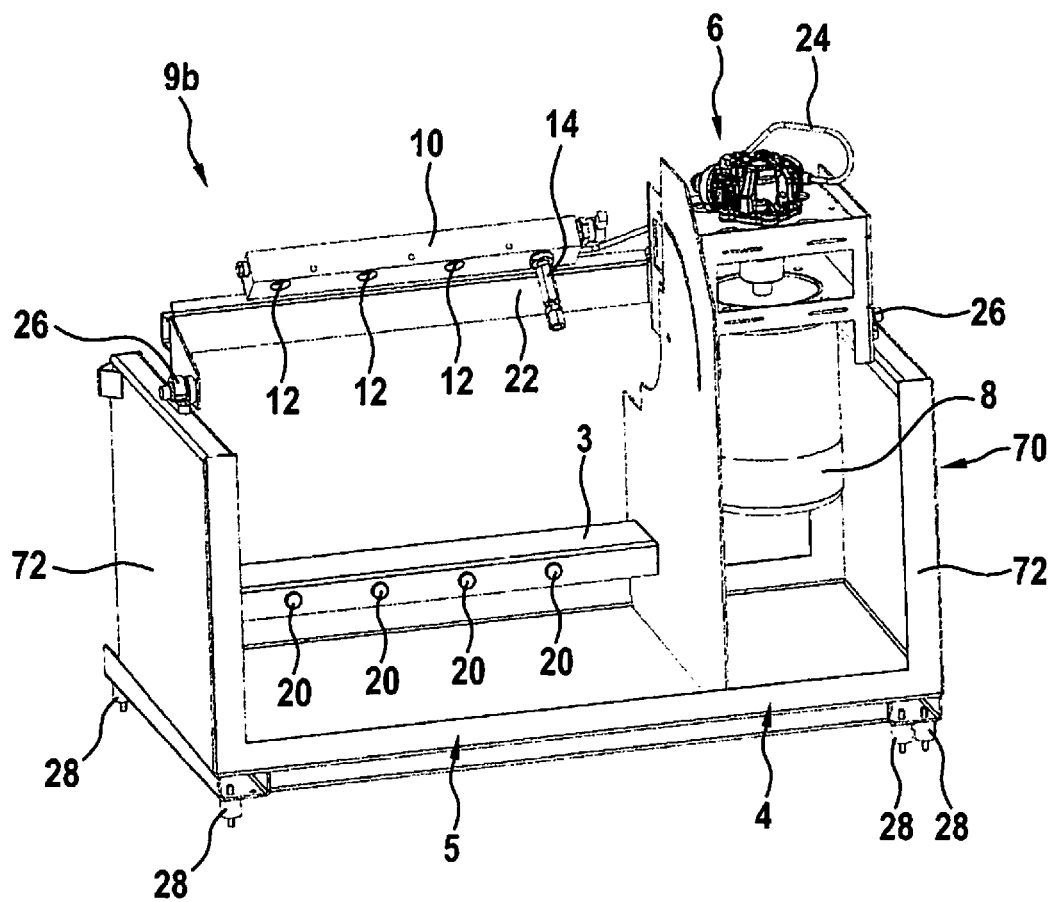
FIG. 4 shows a perspective front view of an assembly according to a further example embodiment of the present invention.

FIG. 4 shows an alternative example embodiment of an assembly 9b. In this example embodiment, assembly 9b includes an oil trough 70 having raised side parts 72, which are configured to accommodate pillow block bearings 26 of swiveling frame 22. In the example embodiment shown in FIG. 3, the complete oil trough 70 is supported elastically by pads 28.

Unlike in the example embodiment shown in FIGS. 1, 2a, and 2b, in this case, the axis of rotation of motor 8 is oriented not parallelly, but perpendicularly to the axis of rotation of swiveling frame 22. Thus, in this design, the orientation of the axis of rotation of motor 8 in space also changes in response to pivoting the swiveling frame 22.

In one further example embodiment not shown in the figures, fluid pump 6 and motor 8 are attached to the non-pivoting, stationary region of device 2. In this case, as well, in order to be able to use rigid fluid lines 24 in place of flexible hoses for the fluid supply, a fluid adaptor 80 is positioned in the axis of rotation.

Figure 5A:
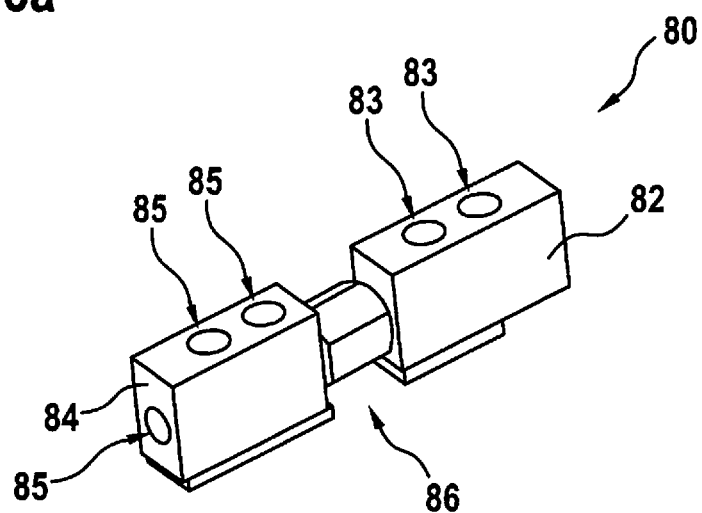
FIG. 5a shows a perspective view of a fluid adaptor according to an example embodiment of the present invention.
Figure 5B:
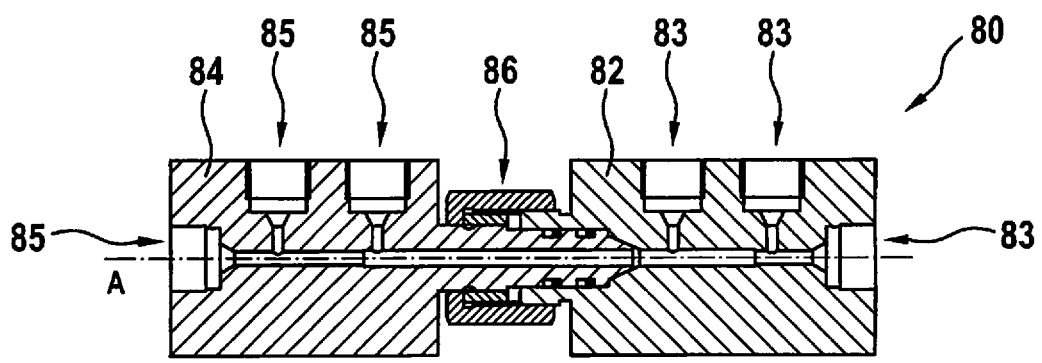
FIG. 5b shows a section of the fluid adaptor according to an example embodiment of the present invention.

FIG. 5a shows a perspective view of an example embodiment of such a fluid adaptor 80, and FIG. 5b shows a section of fluid adaptor 80.

Fluid adaptor 80 has an inlet-side element 82 and an outlet-side element 84, which is connected to inlet-side element 82 in such a manner, that it is rotatable about an axis A, with respect to inlet side element 82. Both inlet-side element 82 and outlet side element 84 have at least one fluid connection 83, 85, respectively, which allows fluid lines 24 to connect to fluid adaptor 80 on both the inlet side and the outlet side. The connection 86 between inlet-side element 82 and outlet-side element 84 is also impervious at high fluid pressure.

Inlet-side element 82 of fluid adapter 80 is connected to the outlet of fluid pump 6. Outlet-side element 84 of fluid adapter 80 is connected to rail 10. Since outlet-side element 84 is rotatable with respect to inlet-side element 82, a rotatable fluid connection between fluid pump 6 and rail 10 can be implemented, even with rigid fluid lines 24 made of, e.g., steel.

What is claimed is:

1. An injector testing device comprising:
a fluid pump;
a motor mechanically connected to, and configured to drive, the fluid pump; and
a rail configured to receive a test oil conveyed by the fluid pump and to fluidly connect to at least one injector to be tested;
wherein the fluid pump, the motor, and the rail are elastically supported in the injector testing device as a common assembly,
wherein the rail is pivotable in the injector testing device.

2. An injector testing device comprising:
a fluid pump;
a motor mechanically connected to, and configured to drive, the fluid pump; and
a rail configured to receive a test oil conveyed by the fluid pump and to fluidly connect to at least one injector to be tested;
wherein the fluid pump, the motor, and the rail are elastically supported in the injector testing device as a common assembly,
wherein the assembly additionally includes at least one injector holding device for mounting the at least one injector,
wherein the at least one injector holding device is displaceable in three spatial directions.

3. An injector testing device comprising:
a fluid pump;
a motor mechanically connected to, and configured to drive, the fluid pump; and
a rail configured to receive a test oil conveyed by the fluid pump and to fluidly connect to at least one injector to be tested;
wherein the fluid pump, the motor, and the rail are elastically supported in the injector testing device as a common assembly;
wherein the assembly additionally includes at least one injector holding device for mounting the at least one injector,
wherein the at least one injector holding device includes a spindle, a cone, and a clamping ring that is expandable by rotation of the spindle to fix the injector holding device in position in the injector testing device without deformation.

* * * * *